(12) United States Patent
Shimoda et al.

(10) Patent No.: US 7,251,074 B2
(45) Date of Patent: Jul. 31, 2007

(54) PROJECTION SCREEN AND METHOD FOR MANUFACTURING THE SAME

(75) Inventors: Kazuhito Shimoda, Kanagawa (JP); Toshitaka Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/476,547

(22) PCT Filed: Mar. 14, 2003

(86) PCT No.: PCT/JP03/03113

§ 371 (c)(1), (2), (4) Date: Mar. 29, 2004

(87) PCT Pub. No.: WO03/077028

PCT Pub. Date: Sep. 18, 2003

(65) Prior Publication Data

US 2004/0150883 A1  Aug. 5, 2004

(30) Foreign Application Priority Data

Mar. 14, 2002 (JP) .............................. 2002-070799

(51) Int. Cl.
*G03B 21/60* (2006.01)
*G02B 1/10* (2006.01)

(52) U.S. Cl. ................ 359/459; 359/587; 359/588; 359/455

(58) Field of Classification Search ................ 359/443, 359/454, 459, 449, 586–588, 455
See application file for complete search history.

(56) References Cited

U.S. PATENT DOCUMENTS

| 4,006,965 A | 2/1977 | Takada et al. |
| 5,193,015 A * | 3/1993 | Shanks ........................ 349/115 |
| 5,715,083 A | 2/1998 | Takayama |
| 6,724,529 B2 * | 4/2004 | Sinkoff ....................... 359/443 |
| 6,822,705 B2 * | 11/2004 | Shimoda et al. .............. 349/62 |
| 6,847,483 B2 * | 1/2005 | Lippey et al. .............. 359/443 |

(Continued)

FOREIGN PATENT DOCUMENTS

JP    06-289491 A    10/1994

(Continued)

OTHER PUBLICATIONS

Macdonald, "Metal-Dielectric Multilayers", London: Adam Hilger Ltd, 1971, pp. 4-26.*

(Continued)

*Primary Examiner*—W. B. Perkey
*Assistant Examiner*—Magda Cruz
(74) *Attorney, Agent, or Firm*—Robert J. Depke; Rockey, Depke, Lyons & Kitzinger LLC.

(57) ABSTRACT

A projection screen and method of manufacturing provides clear images regardless of the brightness of the environment within which the projection screen is used. The projection screen includes an optical thin film comprised of a multi-layer dielectric having alternating high reflectance layers for light in a particular wavelength and high transmittance for visible light except in particular wavelength ranges. The thickness of each of the dielectric multilayer is determined so that the optical thin film forms a band-pass filter.

20 Claims, 8 Drawing Sheets

U.S. PATENT DOCUMENTS

2002/0027665 A1   3/2002   Abe et al.

FOREIGN PATENT DOCUMENTS

| JP | 07-007129 B2 | 1/1995 |
| JP | 09-230505 A | 9/1997 |
| JP | 11-015079 A | 1/1999 |
| WO | WO 00/45220 | 8/2000 |
| WO | WO 00/47001 | 8/2000 |

OTHER PUBLICATIONS

Pelletier E et al, "Interference Filters With Multiple Peaks," Journal of the Optical Society of America, The Society, Menasha, WI, US, vol. 72, No. 6, Jun. 1982, pp. 683-687.

H.A. MacLeod, "Thin-film Optical Filters," 1986, Adam Hilger, Bristol, Great Britain,, pp. 164-172.

* cited by examiner

PROJECTION SCREEN AND METHOD FOR MANUFACTURING THE SAME

This application claims priority to Japanese Patent Application Number JP2002-070799, filed Mar. 14, 2002, which is incorporated herein by reference.

TECHNICAL FIELD

The present invention relates to projection screens, more particularly to a projection screen which enables an image of projected light from a projector to be well perceived even in a bright environment.

BACKGROUND ART

These days, overhead projectors and slide projectors are widely used when speakers present their materials in conferences or the like. Video projectors and motion film projectors employing liquid crystal displays are also becoming popular for home applications. Typically, these projectors optically modulate light from light sources via transparent liquid crystal display panels into image-forming light and emit this image-forming light through optical systems such as lenses, thereby projecting the emitted image-forming light onto screens.

For example, a front projector which can form color images on a screen includes an illumination optical system which separates a light beam emitted from a light source into light components for red (R), green (G), and blue (B) and combines each light component on a predetermined optical path; a liquid crystal display panel (light valve) which optically modulates each light component for red, green, and blue that is separated by the illumination optical system; and a light-combining unit which combines the light components for red, green and blue that are optically modulated by the liquid crystal display panel. The front projector magnifies the color image composed by the light-combining unit to project it onto a screen via a projection lens.

Furthermore, projectors that spatially modulate each light component for red, green and blue using a narrow-band, three-primary-color light source as a light source, and a grating light valve (GLV) in place of the liquid crystal display panel are also being developed these days.

Incidentally, the above-described projectors employ projection screens to project images. These projection screens are broadly divided into a transmissive type in which light is emitted from behind the screen to project an image onto the screen, and a reflective type in which light is projected from the front onto the screen to reflect an image. With either type, bright and high-contrast images are necessary for the screen to provide excellent visibility.

However, unlike self-luminescent displays and rear projectors, the front projector described above exhibits a problem in that it cannot reduce reflection of extraneous light with, e.g., an ND filter, whereby enhancement of the luminous contrast on the screen is difficult.

Figure 10:
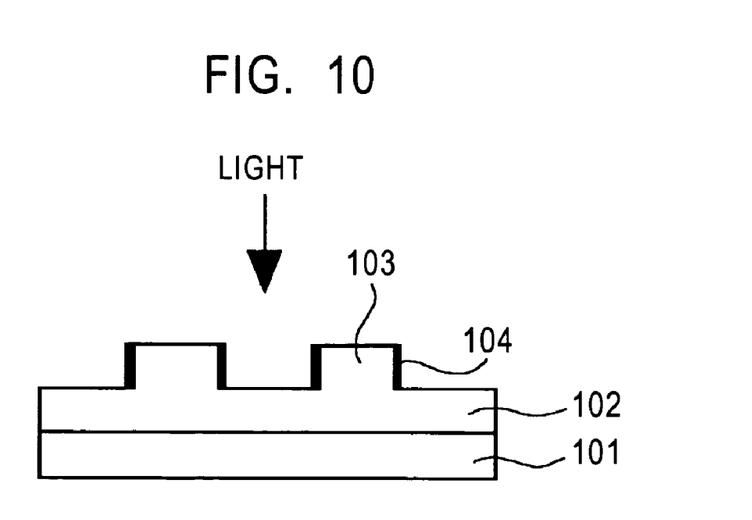
FIG. 10 is a sectional view of an exemplary structure of a conventional screen.
Figure 11:
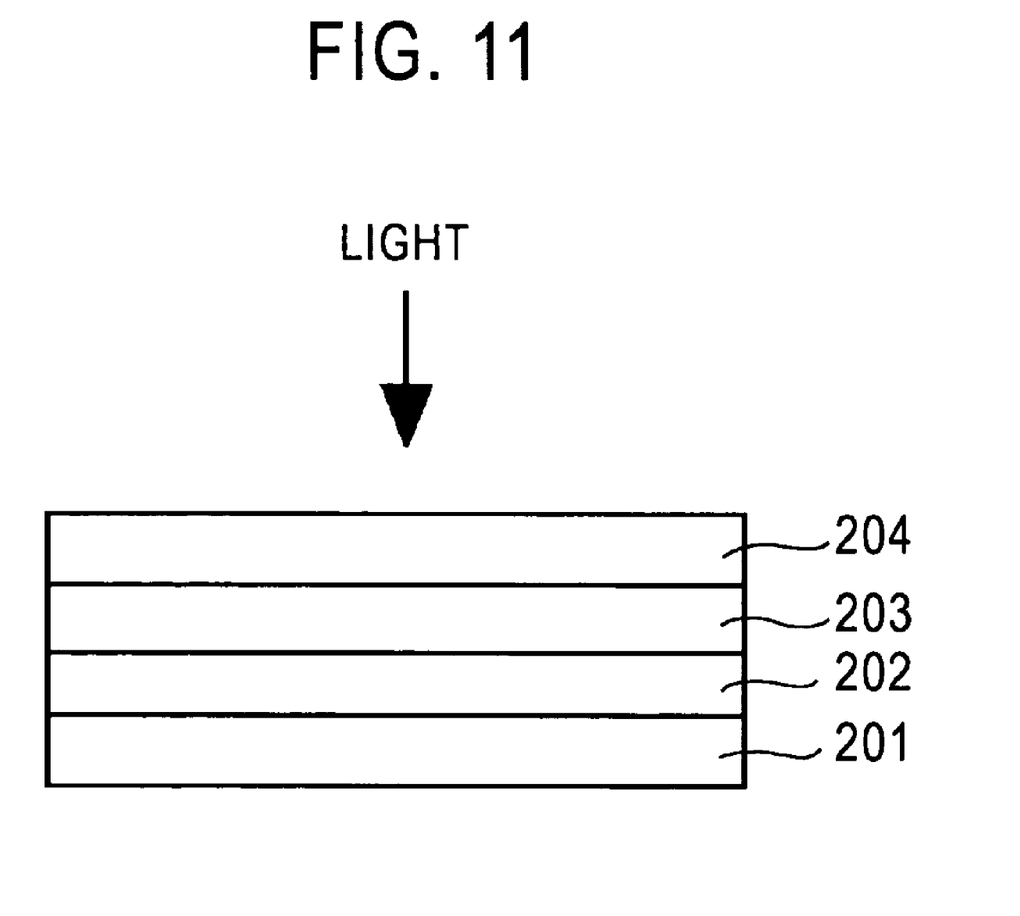
FIG. 11 is a sectional view of an exemplary structure of another conventional screen.

To address this problem, in Japanese Patent No. 2889153, as shown in FIG. 10, a transparent layer 102 is formed on a diffusion layer 101 and protrusions 103 are formed on the surface of the transparent layer 102. Opaque layers 104 are formed by applying black-coating only on the side walls of the protrusions 103. The provision of these opaque layers 104 lowers the black level, leading to an enhancement in brightness and contrast. However, pattern formation and partial coating require time and work. Furthermore, although screens should preferably be flexible for easy storage, this screen has no flexibility. Moreover, Japanese Patent No. 3103802 discloses an example of a flexible screen as shown in FIG. 11. With this screen, all of a supporting member 201, a reflective layer 202, a light absorption layer 203, and a diffusion layer 204 composing the screen are flexible, thereby imparting flexibility to the screen itself. However, the light absorption layer is disposed closer to the surface of the screen than the reflective layer so that the light absorption layer absorbs even the light intended to be reflected, resulting in a lower white level.

The projectors described above reflect projected light that has been subjected to image processing onto the screen, and the image contrast greatly depends on the brightness of the surroundings. Simply increasing the reflectance of the screen allows not only the projected light but also the extraneous light to be well reflected, resulting in deterioration of the perceived image. Hence, it is difficult to obtain a clear image in a bright environment.

The present invention aims to solve the aforementioned problems and it is an object of the present invention to provide a clear image regardless of the brightness of the environment where a projection screen is used.

DISCLOSURE OF INVENTION

In order to attain the above-described object, a projection screen of the present invention displays an image by projecting light from a light source. This projection screen includes an optical thin film composed of dielectric multilayers that have high reflectance for light in particular wavelength ranges and high transmittance for at least visible light outside of the particular wavelength ranges. The thickness of each of the dielectric multilayers composing the optical thin film is determined by simulation based on a matrix method.

With the projection screen of the present invention constructed as described above, the optical thin film functions as so-called a band-pass filer. That is, the optical thin film functions as a band-pass filer that reflects light in particular wavelength ranges and substantially transmits light of wavelengths excluding these particular wavelengths, thereby separating incident light.

Due to this optical thin film, the projection screen reflects most of the light in the particular wavelength ranges. On the other hand, if incidence of extraneous light takes place, the projection screen hardly reflects the extraneous light but transmits most of it.

Accordingly, the projection screen of the present invention can selectively reflect light in the particular wavelengths and suppress reflection of extraneous light as compared to ordinary screens. Thus, the low contrast of an image formed on the projection screen is improved and reflection of extraneous light is effectively reduced, resulting in bright images. Even if the projection screen is used in a bright environment, it can provide clear images regardless of the brightness of the environment where the projection screen is used.

Designing of the optical thin film is a critical factor to achieve the aforementioned functions. For example, the optical thin film is composed of dielectric multilayers where high-refraction layers and low-refraction layers are alternately laminated. Each of the dielectric multilayers is designed by simulation based on a matrix method such that the optical thin film reflects light in particular wavelength ranges and substantially transmits light except the light in the particular wavelength ranges, thereby obtaining the above-mentioned effects.

When the optical thin film is designed by the simulation based on the matrix method so as to reflect the light in the particular wavelength ranges and substantially transmit light except the light in the particular wavelength ranges, a reflective band for the particular wavelengths is formed by the optical thin film. Hence, the optical thin film exhibits high reflectance for the particular wavelengths and high transmittance for the visible light of wavelengths not including the particular wavelengths.

Accordingly, with selection of a red wavelength, a green wavelength and a blue wavelength as the particular wavelengths, the optical thin film is designed by simulation based on the matrix method so as to reflect light in the particular wavelength ranges and substantially transmit light outside of the particular wavelength ranges, whereby the reflective band for the wavelength ranges is formed by the optical thin film. Hence, the optical thin film is constructed to exhibit high reflectance for these wavelengths and to exhibit high transmittance for the visible light of wavelengths not including the particular wavelengths.

The projection screen according to the present invention, besides including the optical thin film, which functions as a band-pass filter, preferably includes a light diffusion layer on the outermost layer of the optical thin film or in the optical thin film as an interlayer. The light diffusion layer diffuses the light reflected by the optical thin film to generate diffused light. Without the provision of the light diffusion layer, a viewer perceives only a specular reflection component as a reflected light from the projection screen. When the reflected light is composed of only the specular reflection component, there are disadvantages for the viewer such as an unclear image and a limited field of view. On the other hand, the light diffusion layer enables the viewer to perceive the diffused light, thereby greatly improving a field of view. Accordingly, the viewer can enjoy natural images.

Furthermore, in order to attain the above-described object, with a method for manufacturing a projection screen according to the present invention, a projection screen includes an optical thin film composed of dielectric multilayers and displays an image by projecting light from a light source. The thickness of each of the dielectric multilayers is determined by simulation based on a matrix method so as to have high reflectance for light in particular wavelength ranges and to have high transmittance for at least visible light outside of the particular wavelength ranges.

With the method for manufacturing a projection screen according to the above-described present invention, the thickness of each of the dielectric multilayers is determined by simulation based on the matrix method so that the optical thin film functioning as so-called a band-pass filter is formed. That is, manufactured is the optical thin film functioning as a band-pass filter that reflects light in the particular wavelength ranges and substantially transmits the light of the wavelengths except the particular wavelengths, thereby separating incident light.

The projection screen having the thus constructed optical thin film reflects most of the light in the particular wavelength ranges. On the other hand, if incidence of extraneous light takes place, the projection screen hardly reflects the extraneous light but transmits most of it.

Accordingly, this projection screen can selectively reflect the light of the particular wavelengths and thus can suppress projection of extraneous light as compared to ordinary screens. Hence, low contrast of an image formed on the projection screen is improved and projection of extraneous light is effectively reduced, thereby providing bright images. Thus, with the method for manufacturing a projection screen according to the present invention, manufactured is a projection screen which can provide clear images regardless of the brightness of the environment where the projection screen is used, even in a bright environment.

BEST MODE FOR CARRYING OUT THE INVENTION

The present invention will now be described with reference to the drawings. The present invention is not restricted to the following description and may be modified within the scope of the present invention.

A projection screen according to the present invention displays an image by projecting light from a light source. This projection screen includes an optical thin film composed of dielectric multilayers having high reflectance for light in particular wavelength ranges and high transmittance for at least visible light other than the light in the particular wavelength ranges. The thickness of each of the dielectric multilayers composing the optical thin film is determined by simulation based on a matrix method.

Figure 1:
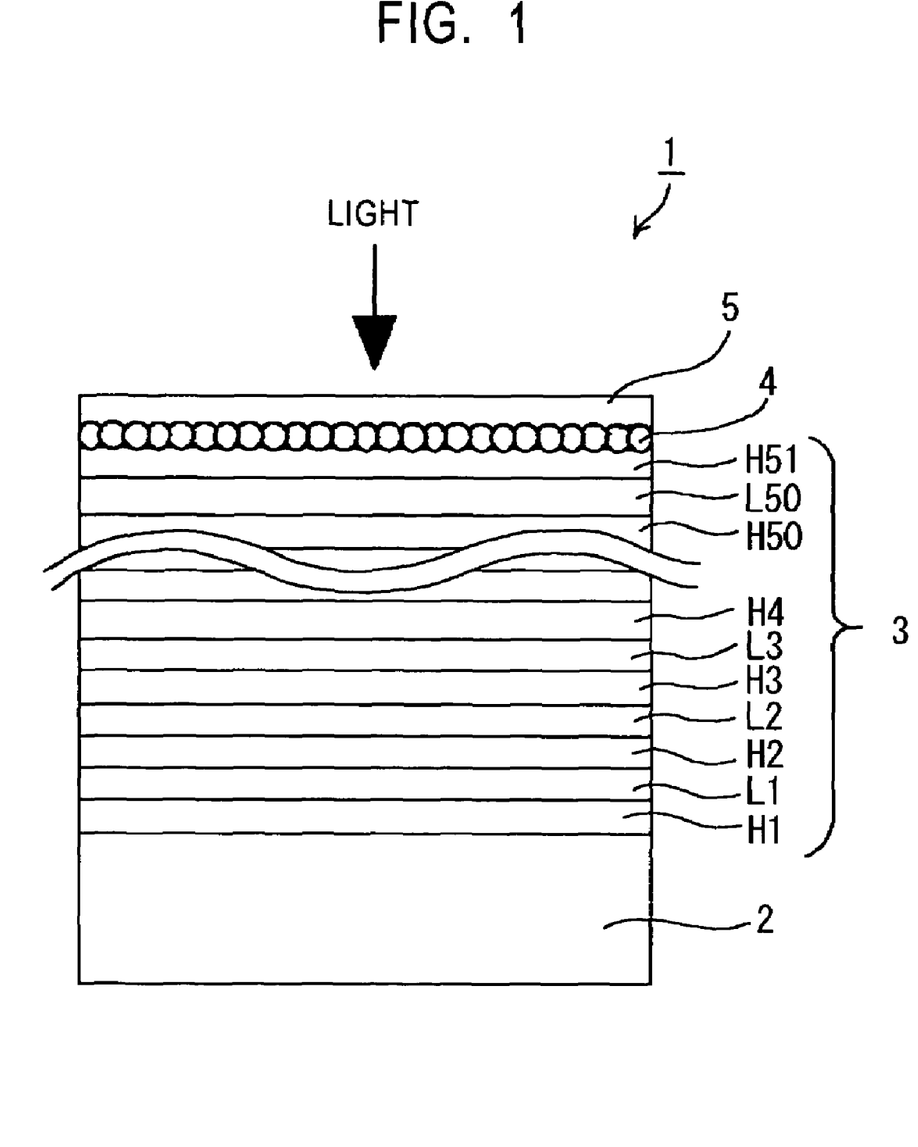
FIG. 1 is a cross-sectional view of an exemplary structure of a projection screen according to the present invention.

FIG. 1 shows a cross-sectional view of a screen for a front projector according to the present invention. A projection screen 1 displays an image from a grating projector having a grating light valve (referred to as a GLV here in below). The projection screen 1 displays an image by projecting three-primary-color light emitted from a three-primary-color light source, which is a light source for the grating projector. The projection screen 1 includes an optical thin film 3 on a screen substrate 2, the optical thin film 3 having dielectric multilayers serving as a band-pass filter. A light diffusion layer 4 is disposed on the optical thin film 3, and a protective film 5 is formed on top of the light diffusion layer 4.

The screen substrate 2 functions as a support for the projection screen 1 and may be composed of a polymer, i.e., poly(ethylene terephthalate) (PET), poly(ethylene naphthalate) (PEN), poly(ether sulfone) (PES), or polyolefin (PO). The screen substrate 2 contains black paint or the like and thus is black. The black screen substrate 2 functions as a light absorption layer. Therefore, as will be described below, the screen substrate 2 absorbs light from the optical thin film 3, suppressing reflection of the light from the optical thin film 3. Accordingly, only the three-primary-color light is obtained as reflected light, leading to an enhancement in black level and an improvement in contrast.

Instead of the above screen substrate 2, the surface of a screen substrate may be black-coated. In such a case, the black coating, serving as the light absorption layer, does not reflect but absorbs the light from the optical thin film 3, causing an enhanced black level and an improved contrast. As described above, since the light absorption layer is formed not on the optical thin film 3 but on the surface of the screen substrate 2, light other than the three-primary-color light is effectively absorbed without absorption of light necessary for projection. In FIG. 1, the screen substrate 2 is composed of black PET and thus functions as both the support and the light diffusion layer.

Furthermore, the screen substrate 2 is composed of a flexible material, thereby imparting flexibility to the projection screen 1 and thus achieving the flexible projection screen 1.

The optical thin film 3 is composed of dielectric multilayers where high-refraction layers H and low-refraction layers L are alternately laminated. The high-refraction layers H are dielectric films composed of a high-refraction material, while the low-refraction layers L are dielectric films composed of a low-refraction material. The thickness of each of the dielectric multilayers is determined by simulation based on a matrix method such that the optical thin film exhibits high reflectance for light in particular wavelength ranges and high transmittance for at least visible light excluding the light in the particular wavelength ranges.

The projection screen 1 includes the optical thin film 3 where high-refraction layers H1-H51 and low-refraction layers L1-L50 are alternately laminated, as shown in FIG. 1. A red wavelength, a green wavelength and a blue wavelength are selected as the particular wavelengths, and with the use of the simulation based on the matrix method, the high-refraction layers H1-H51 and the low-refraction layers L1-L50 are designed to show high reflectance for light of the red, green and blue wavelengths and to show high transmittance for at least visible light excluding the light of the red, green, and blue wavelengths.

Figure 2:
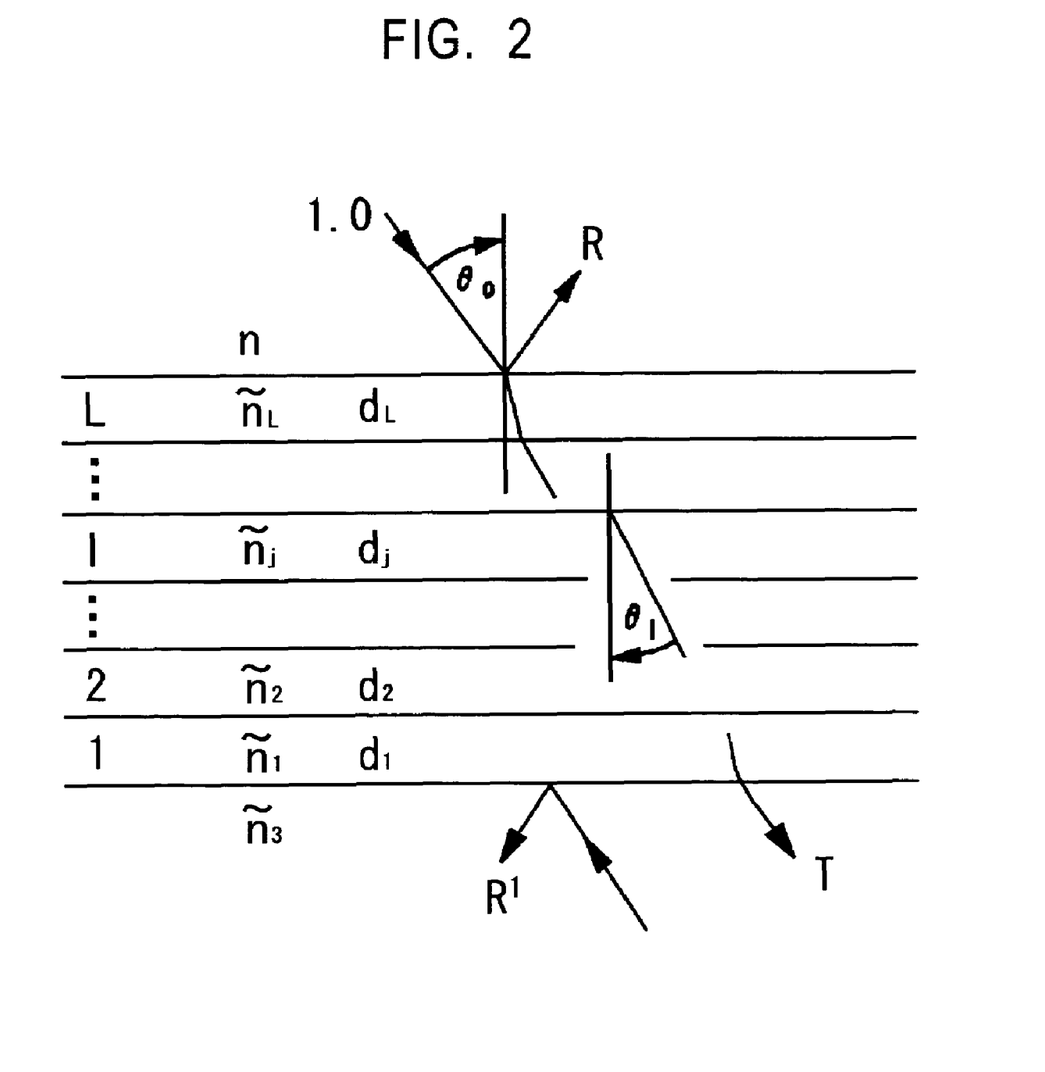
FIG. 2 is a schematic view of a multilayer film.

The theory of film designing by the simulation based on the matrix method will now be briefly described. Referring to FIG. 2, a multilayer optical thin film is composed of a number of different materials and in this optical thin film, multiple reflection occurs at interfaces between these layers, for example. Incidence of light on this optical thin film at an angle of $\theta_0$ will cause the light to become in phase depending on the type and wavelength of the light source and on the optical thickness of each layer (the product of a refractive index and a geometric thickness), and thus the reflected light beams may show coherence, interfering with each other. This is the principal of film designing. Typically an interference filter will now be described.

Referring to FIG. 2, the optical thin film is composed of L layers represented by j=1,2,3, ..., (L−1), L, and each layer has a refractive index $n_j$ and a geometric film thickness $d_j$. A multilayer film is formed on a substrate with a refractive index $n_s$, and light with a wavelength λ is incident on the top of the multilayer film from a medium (in most cases, air $n_m$=1.00) at an angle of $\theta_0$. As shown in the drawing, the incident angle of each layer is $\theta_j$. The plane of polarization of the incident light is determined separately.

The transmittance T and the reflectance R are calculated from the above-described values by a matrix method taking into consideration whether or not Maxwell's equations satisfy the following conditions at the interfaces of layers.

Assuming that the film surface is semi-infinite, the amplitude reflection coefficient r and the transmittance coefficient t for the multilayers L are given by the following equations (1) and (2):

$$r = \frac{\eta_m E_m - H_m}{\eta_m E_m + H_m} \quad (1)$$

$$t = \frac{2\eta_m}{\eta_m E_m + H_m} \quad (2)$$

where $E_m$ and $H_m$ are electric field and magnetic field vectors, respectively, represented by the following equation (3):

$$\begin{pmatrix} E_m \\ H_m \end{pmatrix} = M \begin{pmatrix} 1 \\ \eta_s \end{pmatrix} \quad (3)$$

where M is a matrix product represented by the following equation (4):

$$M = M_L M_{L-1} \ldots M_j \ldots M_2 M_1 \quad (4)$$

where M is a 2 by 2 matrix and thus $M_j$ denotes the j-th matrix of the film represented by the following equation (5):

$$M_j = \begin{pmatrix} m_{11} & im_{12} \\ im_{21} & m_{22} \end{pmatrix} = \begin{pmatrix} \cos\delta_j & i/\eta_j \cdot \sin\delta_j \\ i \cdot \eta_j \sin\delta_j & \cos\delta_j \end{pmatrix} \quad (5)$$

where $\eta_j$ is given by the following equation (6):

$$\delta_j = (2\pi/\lambda)(n_j d_j \cos\theta_j) \quad (6)$$

In equation (6), $n_j\, d_j \cos\theta_j$ represents the effective optical thickness of the j-th layer with the refractive index $\theta_j$ and in equations (1) to (6), each η represents the effective refractive index of the medium, the substrate, or each layer, and is given by the following equation (7), according to parallel (p) or perpendicular (s) light incident on the surface:

$$\eta = \begin{cases} n/\cos\theta(p\text{-POLARIZATION}) \\ n\cos\theta(s\text{-POLARIZATION}) \end{cases} \quad (7)$$

The angle $\theta_j$ is equal to the incident angle $\theta_0$ at the medium from which light is incident, according to Snell's law which is expressed by the following equation (8):

$$n_m \sin\theta_0 = n_j \sin\theta_j \quad (8)$$

The transmittance and intensity of the reflected light are given by the following equations (9) and (10), and the phase change $\epsilon_T$ and $\epsilon_R$ in transmittance and reflection are given by the following equations (11) and (12), respectively:

$$T = (\eta_s/\eta_m)|t|^2 \quad (9)$$

$$R = |r|^2 \quad (10)$$

$$\epsilon_T = \arg t \quad (11)$$

$$\epsilon_R = \arg r \quad (12)$$

In the above description, it is implied that absorption in all the multilayers is negligible and thus T+R=1. However, in a case where any layer absorbs light, the refractive index must be replaced by the complex refractive index represented by the following equation (13):

$$\tilde{n} = n - ik \quad (13)$$

In equation (13), k is an extinction coefficient of the film. Even when a matrix is a complex number, the determinant remains one. Therefore, the absorption coefficient A is determined by the following equation (14):

$$A = 1 - T - R \quad (14)$$

Furthermore, when the polarization of the incident light randomly changes, T and R are given by the following equations (15) and (16):

$$T = \tfrac{1}{2}(T_P + T_S) \quad (15)$$

$$R = \tfrac{1}{2}(R_P + R_S) \quad (16)$$

The simulation based on the above equations determines the characteristics of the optical thin film. According to the present invention, the thickness of the optical thin film 3 with desirable characteristics is calculated by the simulation based on these equations.

When the optical thin film 3 is designed to have a thickness by the simulation based on the matrix method to exhibit high reflectance for light in particular wavelength ranges and to exhibit high transmittance for at least visible light outside of the particular wavelength ranges, that is, when the thickness of the optical thin film 3 is determined so as to reflect the light in the particular wavelength ranges and to substantially transmit the light outside of the particular wavelength ranges, a reflective band for the particular wavelengths is formed by the optical thin film. Due to the formation of this reflective band, the optical thin film 3 reflects the three-primary-color light emitted from the light source without transmitting it. The optical thin film 3 transmits light in the wavelength ranges outside the reflective band. Thus, functioning as a band-pass filter for the wavelength ranges of the three primary colors, the optical thin film 3 selectively reflects the three-primary-color light, and selectively transmits the light in the wavelength ranges excluding the three-primary-color light. Consequently, the optical thin film 3 exhibits high reflectance for the particular wavelengths while exhibiting high transmittance for the visible light except the particular wavelengths.

Thus, the wavelengths for red, green, and blue are selected as the particular wavelengths. The thickness of the optical thin film is determined by the simulation based on the matrix method such that the optical thin film reflects the light of the red, green, and blue wavelengths, and substantially transmits the light of wavelengths not including these red, green, and blue wavelengths. Thus, the reflective band for these wavelengths is formed by the optical thin film 3. Hence, the optical thin film exhibits high reflectance for the three-primary-color light while exhibiting high transmittance for the visible light not including the three-primary-color light.

According to the present invention, it may be possible to design the optical thin film 3 to reflect light of certain narrow wavelength ranges within the wavelength ranges for red, green and blue or light with somewhat broader wavelength ranges. The particular wavelength ranges are not limited to the wavelengths for red, green and blue, and other wavelength ranges may also be used. Furthermore, the number of the particular wavelength ranges is not limited to three but may be one or more than three.

In other words, according to the present invention, since the thickness of the optical thin film 3 is determined by the simulation based on the matrix method, the wavelength range for the reflective band in the optical thin film 3 and the number of wavelength ranges may be freely determined. Thus, the optical thin film 3 with desired characteristics can be obtained due to the very high design freedom in the optical characteristics of the optical thin film 3.

Accordingly, with the projection screen 1, the red, green, and blue wavelengths are selected as the particular wavelengths, and the optical thin film 3 is designed by the simulation based on the matrix method to reflect the light of the red, green and blue wavelengths and to substantially transmit light of the wavelengths except the red, green and blue wavelengths. The three-primary-color light emitted from the three-primary-color light source is selectively reflected and the light except the three-primary-color light is selectively transmitted. The light passing through such an optical thin film 3 is not reflected by the screen substrate 2, which functions as the light absorption layer described above, but is absorbed in the screen substrate 2, so that the three-primary-color light reflected off the reflective band can be extracted as reflected light.

Thus, with the projection screen 1, even if extraneous light reaches the projection screen 1, the light except the three-primary-color light is eliminated by passing through the optical thin film, thereby preventing disadvantages caused by extraneous light such as low contrast and projection of extraneous light.

That is, the projection screen 1 selectively reflects the three-primary-color light and suppresses reflection of extraneous light as compared to ordinary screens, thereby achieving improved contrast of images on the projection screen 1 and effectively reducing projection of extraneous light, resulting in bright images. Accordingly, this projection screen 1 can project a clear image regardless of the environment where the projection screen is used, even in bright surroundings.

As described above, when the emitted light from the three-primary-color light source in the projector has steeper wavelength characteristics, by the synergistic effect with the above-described action of the optical thin film 3, the light reflected by the screen is substantially the same as the light emitted from the projector, thus enhancing the advantages of the present invention. The three-primary-color light source is preferably a light source which emits light with a wavelength distribution of several nanometers, such as laser light.

As described, although laser light is preferred as the light source, a light emitting device such as a light emitting diode with a relatively broad wavelength range may also be used, for example. A light source with a broader wavelength distribution may further be used along with a filter, a nonlinear optical device, or a nonlinear optical thin film to separate the visible light range into three primary colors by wavelength.

The high-refraction layer H may be composed of a high-refraction material such as niobium pentoxide ($Nb_2O_5$), titanium dioxide ($TiO_2$), and tantalum pentoxide ($Ta_2O_5$). The low-refraction layer L may be composed of a low-refraction material such as silicon dioxide ($SiO_2$) and magnesium fluoride ($MgF_2$). According to the present invention, however, the material for the high-refraction layer H is not limited to the ones above, and materials of a refractive index ranging from about 2.0 to 2.6 may preferably be used. Similarly, the material for the low-refraction material L is not limited to the ones above, and materials of a refractive index ranging from about 1.3 to 1.5 may be preferably used.

Furthermore, the thickness of the dielectric multilayers composing the optical thin film 3, namely, the thickness of each of the high-refraction layer H and the low-refraction layer L preferably ranges from about 5 nm to 100 nm. Due to the lamination of the high-refraction layers H and the low-refraction layers L with such thicknesses, the optical thin film 3 reliably functions as a band-pass filter for the wavelengths of three primary colors.

Moreover, the number of dielectric multilayers composing the optical thin film 3 is not specifically limited and may be determined as desired, for example, one hundred and one layers as shown in FIG. 1. Preferably, the dielectric multilayers are constructed such that the outermost layer on which the narrow-band, three-primary-color light is incident and the other outermost layer are composed of the high-refraction layer and thus the total number of layers is odd. The dielectric multilayers, namely, the optical thin film 3 composed of odd dielectric films functions better than that composed of even dielectric films as a band-pass filter for the wavelengths of three primary colors.

Specifically, the sum of the high-refraction layers H and the low-refraction layers L is preferably about 50 to 100 layers. If the number of layers is too small, the optical thin film 3 may not be able to sufficiently serve as a band-pass filter for the wavelengths of three primary colors. If the number of layers is too large, it takes a long time to manufacture the optical thin film 3. Accordingly, the sum of the high-refraction layers H and the low-refraction layers L is about 50 to 100 layers so that the optical thin film 3 sufficiently functions as a band-pass filter for the wavelengths of the three primary colors, and thus the optical thin film 3 is efficiently constructed.

As shown in FIG. 1, the projection screen 1 includes a light diffusion layer 4 on the optical thin film 3. The light diffusion layer 4 diffuses the light reflected by the optical thin film 3 to generate diffused light. The projection screen 1 reflects the three-primary-color light thanks to the provision of the optical thin film 3 so that a viewer perceives the reflected image of the image projected on the projection screen 1, namely, the reflected light of the image projected on the projection screen 1. However, when the reflected light on the screen is composed of a specular reflection component, there are problems for the viewer such as an unclear image and a limited field of view. That is, the viewer cannot perceive natural images.

To this end, the light diffusion layer 4 is provided in the projection screen 1, enabling a diffusive reflection component from the projection screen to be perceived. As shown in FIG. 1, provision of the light diffusion layer 4 on the optical thin film 3 permits the light which has passed through the light diffusion layer 4 and been reflected by the optical thin film 3 to pass through the light diffusion layer 4 one more time. At this time, the light reflected by the optical thin film 3 is diffused through the light diffusion layer 4, thereby obtaining the diffusive reflection component excluding a specular reflection component. The reflected light from the projection screen 1 is composed of the specular reflection component and the diffusive reflection component so that the viewer can perceive the diffusive reflection component in addition to a specular reflection component, resulting in a great improvement in the field of view. Hence, the viewer can enjoy natural images.

The diffusive reflection component is diffused light that has been reflected by the optical thin film 3. The optical thin film 3 reflects light of predetermined wavelengths, i.e., the three-primary-color light, so naturally the diffusive reflection component is also the three-primary-color light. Accordingly, even if extraneous light enters the projection screen 1, the light other than the three-primary-color light will not constitute the diffusive reflection component. Hence, the light diffusion layer 4 suppresses low contrast and projection of the extraneous light, leading to a preferable field of view.

The light diffusion layer 4 is not specifically limited and any known diffusion layer may be used. For example, as shown in FIG. 1, the layer may be composed of arrayed beads. The light diffusion layer 4 composed of the arrayed beads may exhibit excellent light diffusion characteristics for light of a particular wavelength range by altering various conditions such as the type or size of the beads employed. That is, provision of such a light diffusion layer causes a projection screen to exhibit excellent light diffusion characteristics exclusively for the light of a particular wavelength range. Alternatively, a microlens array (MLA) film may be used as the light diffusion layer 4.

The above-described light diffusion layer 4 may be composed of one layer or several layers depending on the application of the projection screen. The light diffusion layer 4 may be disposed on the optical thin film 3, namely, on the topmost layer of the dielectric multilayers or in the optical thin film 3 as an interlayer. In either way, the same effects described above can be achieved.

A protective film 5 protects the optical thin film 3 and the light diffusion layer 4 from the exterior and has no optical function as a band-pass filter. Assuming that materials composing the optical thin film 3 and the light diffusion layer 4 are sensitive to moisture and the projection screen is used in a very humid environment or exposed to water, the optical thin film 3 might deteriorate, resulting in lower durability and compromised quality. Furthermore, a graze or scratch due to external factors might also deteriorate its durability or quality. Thus, the protective film 5 protects the optical thin film 3 and the light diffusion layer 4, providing a durable, high-quality projection screen.

The above-described projection screen 1 may be manufactured as follows.

First, the screen substrate 2 composed of black PET is prepared as the screen substrate and the optical thin film 3 constituted of the dielectric multilayers is formed on one surface of the screen substrate 2.

The optical thin film 3 is composed of the dielectric multilayers. Specifically, as shown in FIG. 1, the high-refraction layers H1-H51, which are dielectric films composed of a high-refraction material, and the low-refraction layers L1-L50, which are dielectric films composed of a low-refraction material, are alternately laminated by AC sputtering to form a total of one hundred and one laminated layers of the optical thin film 3. At this time, the optical thin film 3 is formed such that its thickness is determined by the simulation based on the matrix method in order for the optical thin film to have high reflectance for the wavelength ranges for the three primary colors, namely, the wavelength ranges for blue, green and red, and to have high transmittance, i.e., low reflectance for wavelength ranges other than these wavelength ranges for the three primary colors, and then the thickness of each high-refraction layer H and low-refraction layer L is determined.

Next, on the resultant optical thin film 3, the light diffusion layer 4 composed of arrayed beads with a predetermined size is formed, and the protective film 5 is formed on top of the light diffusion layer 4, thereby completing the projection screen 1. The light diffusion layer 4 and the protective film 5 may be formed with any known method.

Figure 3:
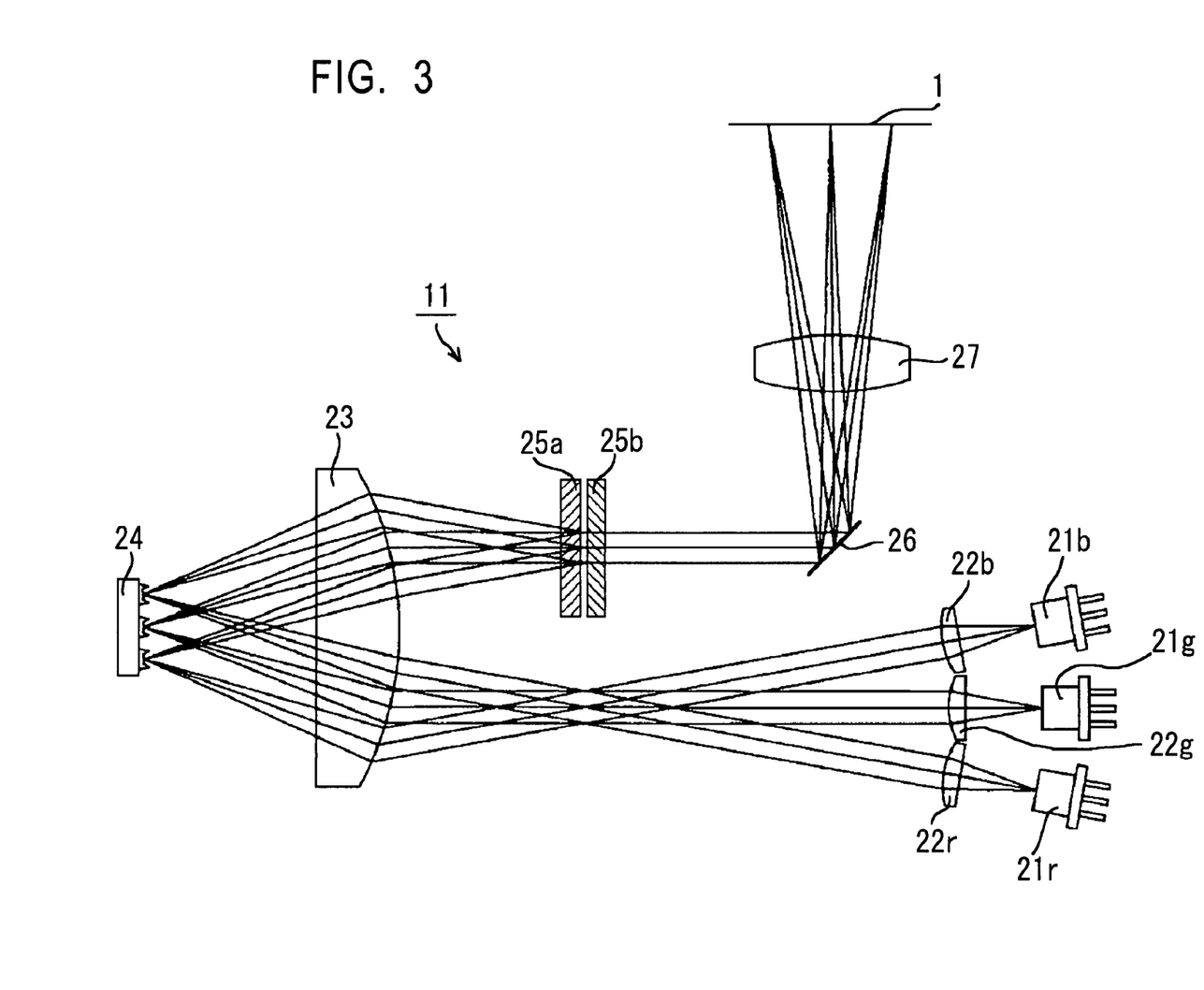
FIG. 3 is a schematic view of the structure of a grating projector.

A grating projector 11 employing a GLV, which will be described below, may be used as the grating projector.

As shown in FIG. 3, the grating projector 11 includes a first laser oscillator 21r, a second laser oscillator 21g, and a third laser oscillator 21b which are light sources emitting a red light component, a green light component, and a blue light component, respectively. In the description below, the first, second, and third laser oscillators 21r, 21g, and 21b may be collectively called laser oscillators 21. The laser oscillators 21 may be constituted of a semiconductor laser device or a solid-state laser device which emits light for each color. The first, second, and third laser oscillators 21r, 21g, and 21b, respectively, emit narrow-band, three-primary-color light; the wavelength of the red laser light component is 642 nm, the wavelength of the green laser light component is 532 nm, and the wavelength of the blue laser light component is 457 nm.

In the grating projector 11, a collimator lens 22r for the red laser light component, a collimator lens 22g for the green laser light component, and a collimator lens 22b for the blue laser light component are provided on the optical axis of each light component emitted from each laser oscillator 21. Simply, these collimator lenses are collectively called collimator lenses 22. Light emitted from the laser oscillators 21 is collimated by the respective collimator lenses 22 to be incident on a cylindrical lens 23. The cylindrical lens 23 converges the incident light on a GLV 24.

More specifically, the grating projector 11 does not use light only from a single light source but includes, as a light source, the laser oscillators 21 for each of the three colors, each of which separately emits light. Furthermore, the grating projector 11 is constructed such that light emitted from each laser oscillator 21 is incident directly on the cylindrical lens 23 via the collimator lens 22.

The GLV 24 will now be described. First of all, the principle of the GLV will be described. The GLV has, on a substrate, a plurality of precision strips formed with the use of semiconductor manufacturing technologies. Each strip is freely moved up and down by a piezoelectric device or the like. With the thus constructed GLV, each strip is driven mechanically to change its height and irradiated with light of a predetermined wavelength, thereby constituting a phase grating as a whole. That is, the GLV creates diffracted light of the ±1-st order (or higher order) by light irradiation.

Such a GLV is irradiated with light while diffracted light of the 0th order is blocked. This allows each strip in the GLV to move up and down to create or quench diffracted light, thereby displaying an image.

Various types of display devices which display images utilizing the aforementioned features of the GLV are proposed. With such display devices, in displaying a plane image having display units (referred to as pixels below), one pixel is defined by about six strips. In a group of strips corresponding to one pixel, adjacent strips are moved up and down alternately.

By separately wiring each strip of the GLV to drive them individually, a desirable one-dimensional phase distribution is generated. The thus constituted GLV is regarded as a specular one-dimensional spatial phase modulator.

Figure 4:
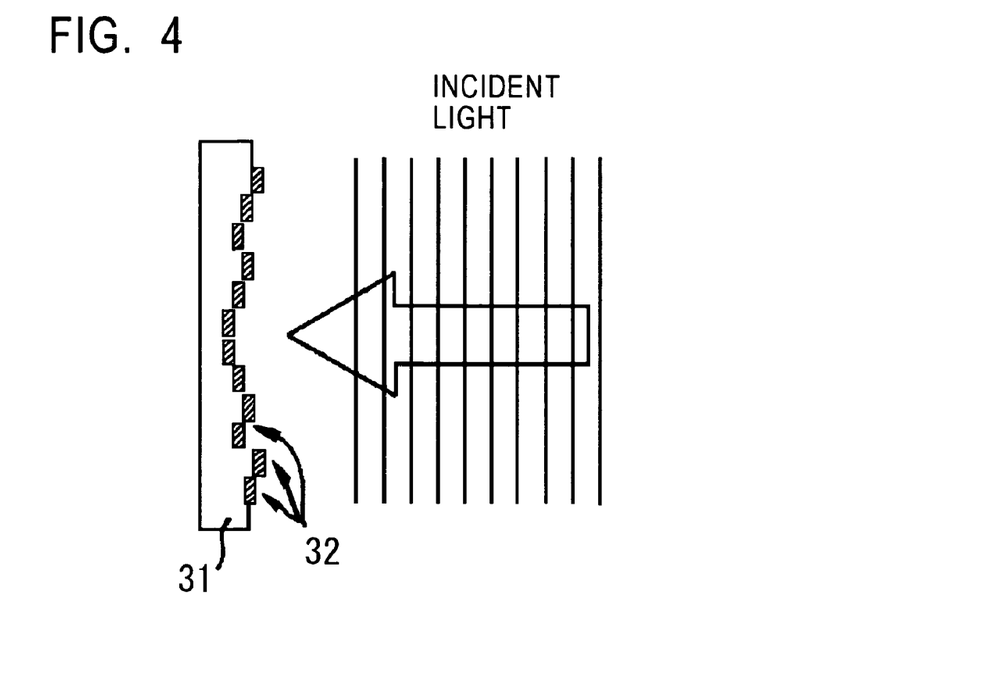
FIG. 4 is a conceptual view of a state of light incident on a GLV.
Figure 5:
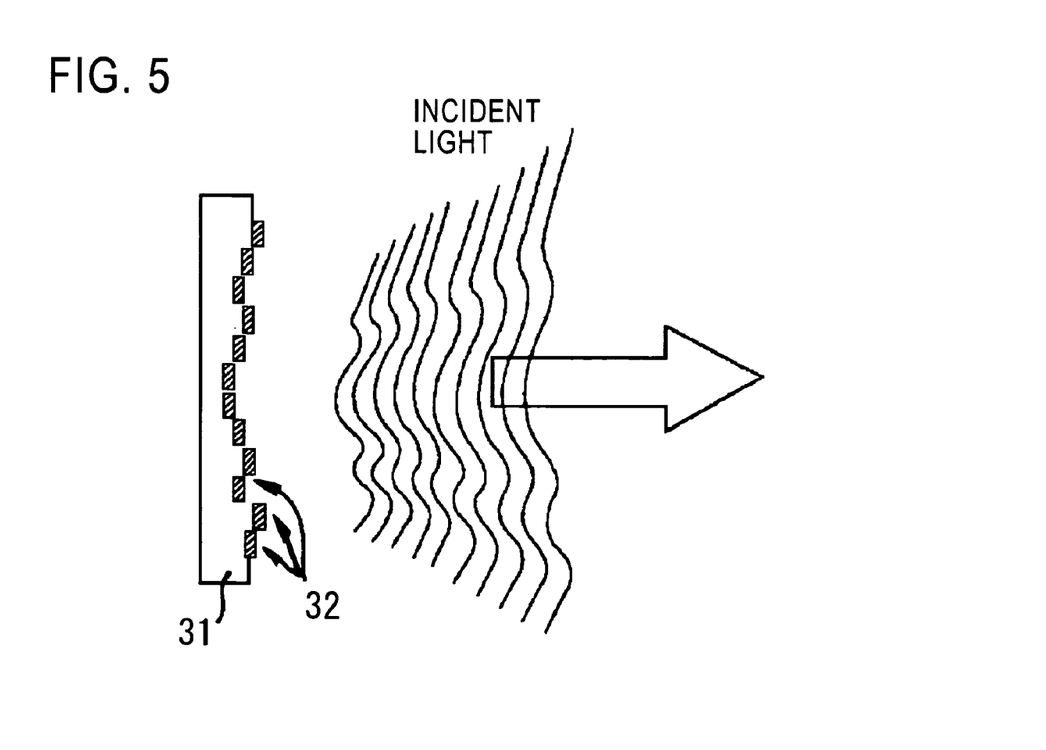
FIG. 5 is a conceptual view of a state of a light reflected by the GLV.

When the GLV is constituted as the specular one-dimensional spatial phase modulator, for example, as shown in FIG. 4, each strip 31 of a GLV 31 is separately driven to form a desirable phase distribution. Light of a predetermined wavelength that is in phase relative to the GLV 31 is incident on the GLV as indicated by the arrow in FIG. 4, and is modulated to be reflected, thereby generating a desirable one-dimensional wave front as shown in FIG. 5.

Figure 6:
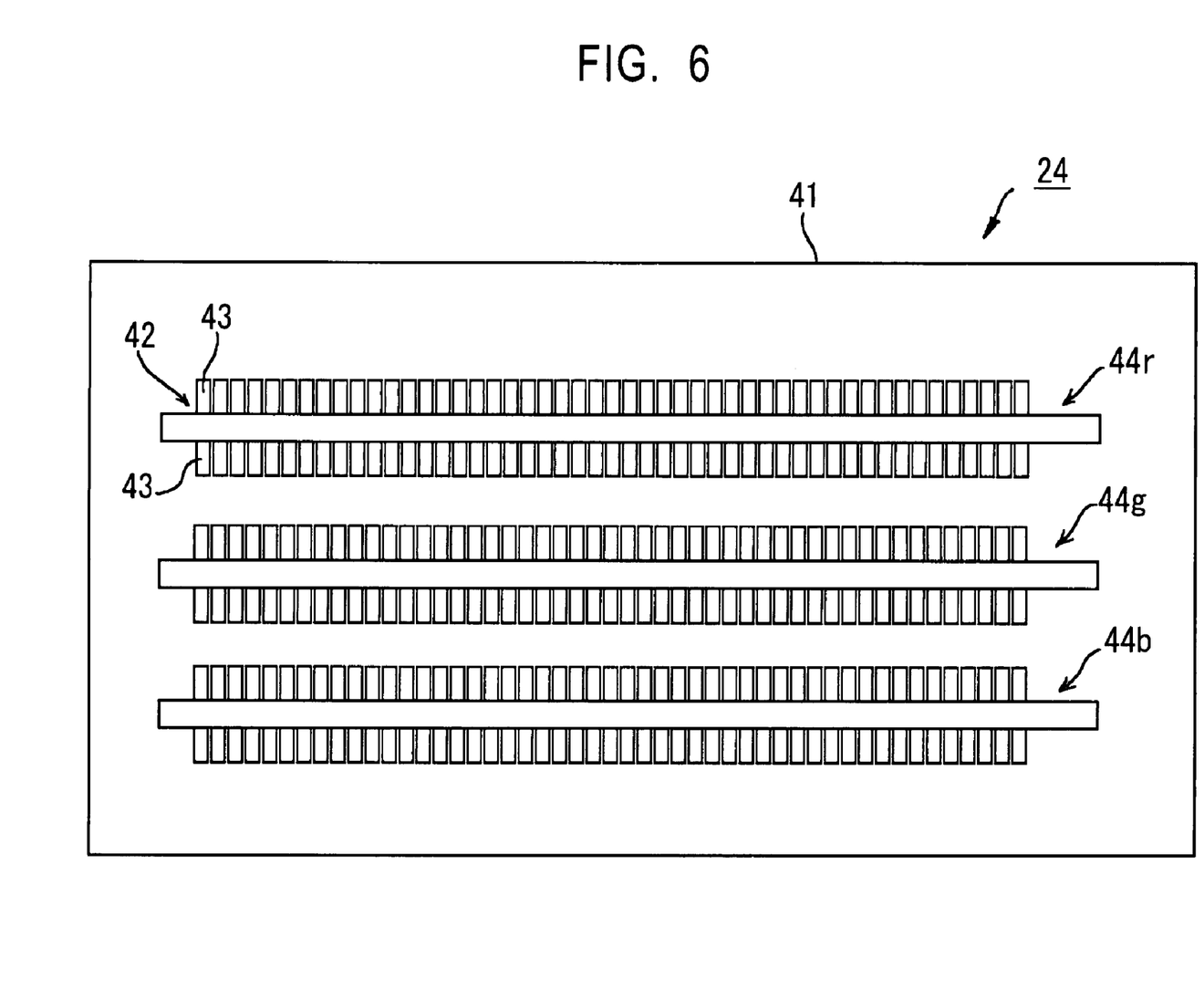
FIG. 6 is a plan view of an exemplary structure of the GLV.

As shown in FIG. 6, the GLV 24 utilizing such a principle includes a plurality of fine strips 42 formed on a substrate 41. Each strip 42 includes a driver 43 composed of circuitry and wiring for driving and the driver 43 drives each strip 42 to move up and down relative to the main surface of the substrate 41.

With the GLV 24, the strips 42 are arranged one-dimensionally to constitute a strip row. A plurality of strip rows is disposed for each wavelength of incident light. Specifically, as typically shown in FIG. 6, a red light component, a green light component, and a blue light component of three-color light are incident on the GLV 24, and at the position on which these light components are incident, a strip row 44r for the red light component, a strip row 44g for the green light component, and a strip row 44b for the blue light component are arranged side by side parallel to each other. Simply, these strip rows 44r, 44g, and 44b are collectively called strip rows 44 hereinbelow.

In the strip rows 44, each strip 42 can be driven separately and thus the strip rows 44 can create a desirable phase distribution, as described with reference to FIG. 4 and FIG. 5. Therefore, with the GLV 24, a desirable one-dimensional wave front is separately formed for each of the incident red light component, green light component, and blue light component by the respective strip row 44r for the red light component, the strip row 44g for the green light component, and the strip row 44b for the blue light component.

Therefore, with the GLV 24, the incident three-color light is spatially modulated respectively by the strip row 44r for the red light component, the strip row 44g for the green light component, and the strip row 44b for the blue light component to be reflected as a desirable one-dimensional wave front. That is, the GLV 24 functions as a spatial modulator in a display device 30.

The thus constructed GLV 24 is finely produced with semiconductor manufacturing technologies and operated at very high speed. Therefore, the GLV 24 is suitable for the spatial modulator in an image display device, for example. Furthermore, the GLV 24 includes the respective strip rows 44 for the wavelength range of each light component to be modulated and these strip rows 44 are integrally formed with the substrate 41. Thus, the image display device employing the GLV 24 as the spatial modulator not only has a low parts count but also does not require alignment of strip rows for the wavelength of each light component.

In the grating projector 11, light which has been modulated and reflected by the GLV 24 reenters the cylindrical lens 23 to be collimated thereby. A first volume hologram 25a and a second volume hologram 25b are disposed on the optical path of the collimated light by the cylindrical lens 23.

The first volume hologram 25a diffracts the red light component WR and the second volume hologram 25b diffracts the blue light component WB in the same direction as the red light component WR is diffracted. These first and second volume holograms 25a and 25b do not diffract the green light component WG but let it travel straight ahead to be emitted through the holograms in the same direction as the red light component WR is diffracted. In this way, the three-color light components diffracted by the GLV 24 are combined to be emitted in a fixed direction. That is, in the grating projector 11, the first and the second volume holograms 25a and 25b constitute a wave-combining unit.

The light combined by the first and second volume holograms 25a and 25b is scanned by a galvano meter mirror 26 in a predetermined direction and projected via a projection lens 27 onto the projection screen 1. Thus, the grating projector 11 displays a color image on the projection screen 1.

As is described above, with the projection screen 1 of the present invention, the three-primary-color light emitted from the grating projector 11 passes through the protective film 5 and the light diffusion layer 4 to be incident on and reflected by the optical thin film 3. Then, this reflected light reenters the light diffusion layer 4 to be diffused at a predetermined ratio and this diffusive reflection component is emitted through the protective film 5. The reflected light component which is not diffused by the light diffusion layer passes through the protective film 5 to be emitted as the specular reflection component. Accordingly, the reflected light from the projection screen 1 is composed of the specular reflection component and the diffusive reflection component, whereby the viewer can perceive not only the specular reflection component but also the diffusive reflection component, leading to a great improvement in the field of view. Thus, the viewer can enjoy natural images.

Furthermore, the specular reflection component and the diffusive reflection component constitute the light reflected off the optical thin film 3. The light of predetermined wavelengths, that is, the three-primary-color light, is reflected by the optical thin film 3 so that the specular reflection component and the diffusive reflection component are also three-primary-color light. Accordingly, even though extraneous light enters the projection screen 1, light except the three-primary-color light will not be reflected, thereby effectively improving the low image contrast and projection of extraneous light caused by extraneous light, leading to clear images. Hence, the projection screen 1 can provide clear images regardless of the brightness of the environment where the projection screen is used, even in a bright environment.

Figure 7:
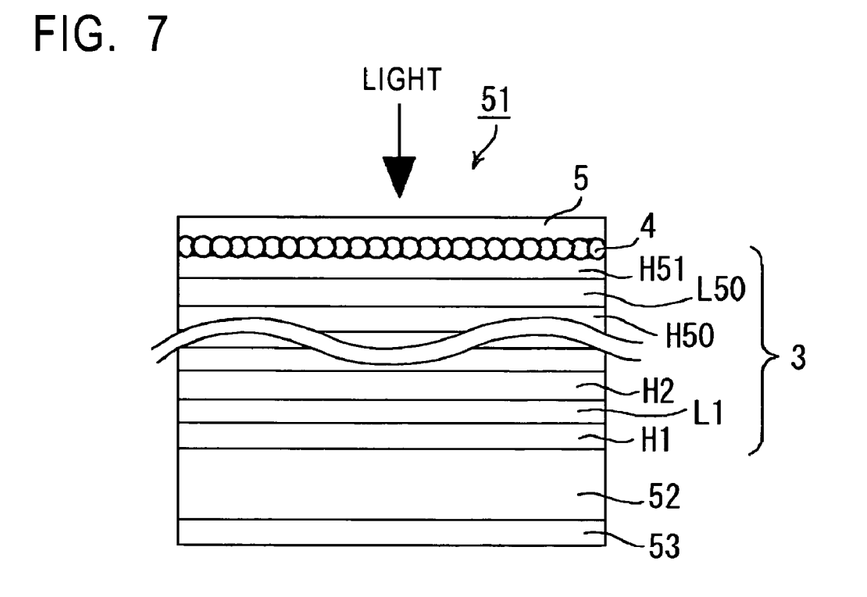
FIG. 7 is a cross-sectional view of another exemplary structure of the projection screen according to the present invention.

Next, a modification of the above-described projection screen 1 will now be described. FIG. 7 shows a cross section of a projection screen 51 according to another embodiment of the projection screen. The same components shown in FIG. 1 are denoted by the same reference numerals in FIG. 7 and detailed description thereof is omitted here; only those components different from FIG. 1 will be described hereinbelow. The projection screen 51 includes an optical thin film 3 on a transparent screen substrate 52 and this optical thin film 3, which is composed of dielectric multilayers, serves as a band-pass filter. On the optical thin film 3, a light diffusion layer 4 is disposed and a protective film 5 is formed on top of the light diffusion layer 4. A light absorption layer 53 composed of a black-coated film is formed on the bottom face of the screen substrate 52. That is, with a projection screen 2, the black-coated film functions as the light absorption layer 53. The black-coated film does not reflect but absorbs the light passed through the optical thin film 3 and the screen substrate 52, thereby enhancing the black level and improving the contrast.

In the projection screen 51, the optical thin film 3 is provided so that three-primary-color light emitted from a light source passes through the protective film 5 and the light diffusion layer 4 to be incident on and reflected off the optical thin film 3. This reflected light reenters the light diffusion layer 4 and is diffused at a predetermined ratio to be emitted as a diffusive reflection component through the protective film 5. The reflected light component that is not diffused at the light diffusion layer 4 passes through the protective film 5 to be emitted as a specular reflection component. The light that is not reflected at the optical thin film 3 passes through the screen substrate 52 to be absorbed in the light absorption layer 53 composed of the black-coated film. Thus, the reflected light from the projection screen 1 is composed of the specular reflection component and the diffusive reflection component of the three-primary-color light. The viewer can perceive not only the specular reflection component but also the diffusive reflection component, greatly improving the field of view. Hence, the viewer can enjoy natural images. Similarly to the projection screen 1, the thus constructed projection screen 2 can provide a clear image regardless of the brightness of the environment where the projection screen is used, even in a bright environment.

The projection screen 51 described above may be manufactured as follows.

First, the transparent screen substrate 52 is prepared as a screen substrate and the optical thin film 3 composed of the dielectric multilayers is formed on one surface of the screen substrate 52.

The optical thin film 3 is composed of dielectric multilayers. Specifically, as shown in FIG. 7, high-refraction layers H1-H51, which are dielectric films composed of a high-refraction material, and low-refraction layers L1-L50, which are dielectric films composed of a low-refraction material, are alternately laminated by AC sputtering to form a total of one hundred and one laminated layers of the optical thin film 3. At the formation of the dielectric multilayers, the thickness of the optical thin film 3 is calculated by the simulation based on the matrix method such that the optical thin film exhibits high reflectance for the three-primary-color light with the blue, green and red wavelengths and also exhibits high transmittance, i.e., low reflectance, for light of wavelengths other than the blue, green and red wavelengths. The thickness of each high-refraction layer H and low-refraction layer L is determined based on this calculation to form the optical thin film 3.

The light diffusion layer 4 with arrayed beads of a predetermined size is formed on the thus constructed optical thin film 3 and a protective film 5 is formed on top of the light diffusion layer 4. On the bottom face of the screen substrate 52, namely, on the main surface opposing the surface on which the optical thin film 3 is formed, black-coating is applied to form the light absorption layer 53, thereby manufacturing the projection screen 51. The light diffusion layer 4 and the protective film 5 may be formed using any known method.

EXAMPLE

The present invention will now be described in more detail by referring to a specific example. The present invention is not restricted to the following example and may be modified within the scope of the present invention.

With the example, a projection screen according to the present invention was constructed as a grating projection screen with an optical thin film functioning as a band-pass filter for narrow-band, three-primary-color light. This grating projection screen may be employed in the above-described grating projector in FIG. 3, for example.

Figure 8:
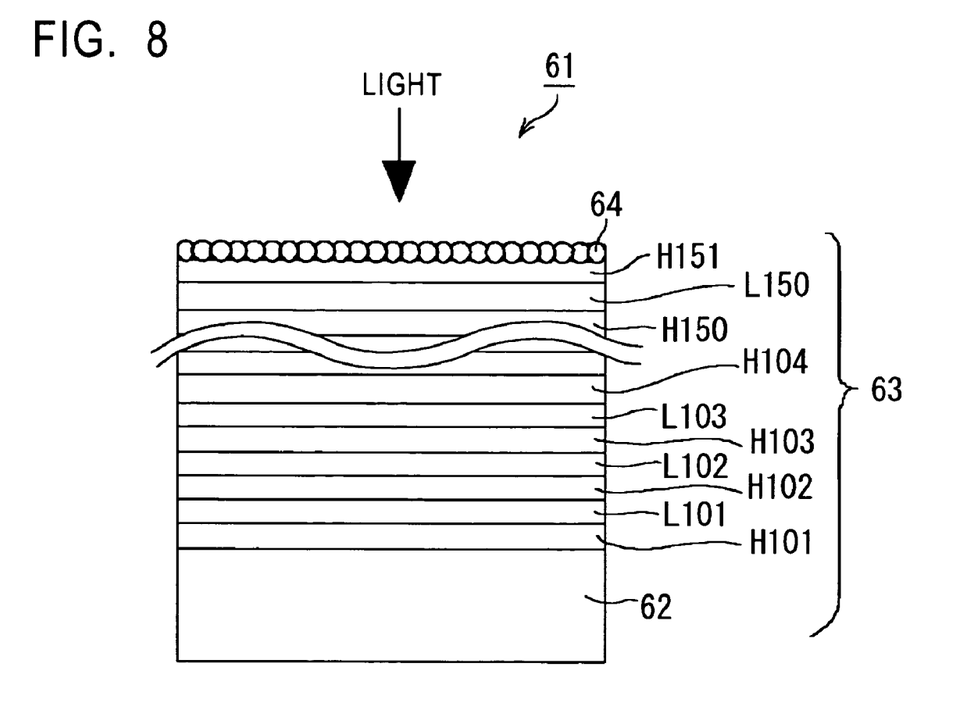
FIG. 8 is a cross-sectional view of the projection screen according to an example.

A screen substrate 62 composed of black PET with a thickness of 188 μm was prepared as a screen substrate and on one surface of the screen substrate 62, an optical thin film 63 composed of dielectric multilayers was formed, thereby completing a grating projection screen 61.

The optical thin film 63 was composed of dielectric multilayers. Specifically, as shown in FIG. 8, high-refraction layers H101-H151 and low-refraction layers L101-L150 were alternately laminated by AC sputtering to form a total of one hundred and one laminated layers of the optical thin film 63. The high-refraction layers H101-H151 were dielectric films composed of $Nb_2O_5$, which is a high-refraction material, and the low-refraction layers L101-L150 were dielectric films composed of $SiO_2$, which is a low-refraction material. In the example, the thickness of each layer of the optical thin film 63 was determined by simulation based on the matrix method such that the optical thin film 63 exhibited high reflectance, namely, a high reflection coefficient, for the three-primary-color light with a blue wavelength of about 460 nm, a green wavelength of about 520 nm, and a red wavelength of about 620 nm. The thickness of each layer is shown in Table 1.

TABLE 1

| LAYER | MATERIAL | THICKNESS |
|---|---|---|
| H1 | $Nb_2O_5$ | 58.10 |
| L1 | $SiO_2$ | 52.37 |
| H2 | $Nb_2O_5$ | 7.37 |
| L2 | $SiO_2$ | 59.39 |
| H3 | $Nb_2O_5$ | 27.24 |
| L3 | $SiO_2$ | 20.71 |
| H4 | $Nb_2O_5$ | 16.69 |
| L4 | $SiO_2$ | 32.70 |
| H5 | $Nb_2O_5$ | 25.72 |
| L5 | $SiO_2$ | 24.19 |
| H6 | $Nb_2O_5$ | 18.55 |
| L6 | $SiO_2$ | 37.34 |
| H7 | $Nb_2O_5$ | 15.23 |
| L7 | $SiO_2$ | 32.47 |
| H8 | $Nb_2O_5$ | 18.00 |
| L8 | $SiO_2$ | 30.08 |
| H9 | $Nb_2O_5$ | 26.90 |
| L9 | $SiO_2$ | 25.26 |
| H10 | $Nb_2O_5$ | 29.03 |
| L10 | $SiO_2$ | 35.72 |
| H11 | $Nb_2O_5$ | 17.04 |
| L11 | $SiO_2$ | 51.78 |
| H12 | $Nb_2O_5$ | 22.29 |
| L12 | $SiO_2$ | 28.42 |
| H13 | $Nb_2O_5$ | 28.59 |
| L13 | $SiO_2$ | 22.69 |
| H14 | $Nb_2O_5$ | 21.62 |
| L14 | $SiO_2$ | 39.71 |
| H15 | $Nb_2O_5$ | 9.87 |
| L15 | $SiO_2$ | 39.31 |
| H16 | $Nb_2O_5$ | 26.04 |
| L16 | $SiO_2$ | 16.02 |
| H17 | $Nb_2O_5$ | 24.13 |
| L17 | $SiO_2$ | 42.56 |
| H18 | $Nb_2O_5$ | 17.13 |
| L18 | $SiO_2$ | 30.78 |
| H19 | $Nb_2O_5$ | 30.57 |
| L19 | $SiO_2$ | 27.74 |
| H20 | $Nb_2O_5$ | 15.62 |
| L20 | $SiO_2$ | 44.34 |
| H21 | $Nb_2O_5$ | 25.51 |
| L21 | $SiO_2$ | 23.92 |
| H22 | $Nb_2O_5$ | 23.41 |
| L22 | $SiO_2$ | 36.27 |
| H23 | $Nb_2O_5$ | 16.25 |
| L23 | $SiO_2$ | 34.01 |
| H24 | $Nb_2O_5$ | 17.15 |
| L24 | $SiO_2$ | 30.60 |
| H25 | $Nb_2O_5$ | 26.53 |
| L25 | $SiO_2$ | 21.38 |
| H26 | $Nb_2O_5$ | 26.55 |
| L26 | $SiO_2$ | 39.37 |
| H27 | $Nb_2O_5$ | 18.95 |
| L27 | $SiO_2$ | 44.61 |
| H28 | $Nb_2O_5$ | 23.90 |
| L28 | $SiO_2$ | 25.88 |
| H29 | $Nb_2O_5$ | 26.39 |
| L29 | $SiO_2$ | 25.30 |
| H30 | $Nb_2O_5$ | 21.31 |
| L30 | $SiO_2$ | 37.21 |

TABLE 1-continued

| LAYER | MATERIAL | THICKNESS |
|---|---|---|
| H31 | $Nb_2O_5$ | 11.22 |
| L31 | $SiO_2$ | 35.85 |
| H32 | $Nb_2O_5$ | 26.10 |
| L32 | $SiO_2$ | 17.78 |
| H33 | $Nb_2O_5$ | 19.23 |
| L33 | $SiO_2$ | 43.30 |
| H34 | $Nb_2O_5$ | 19.41 |
| L34 | $SiO_2$ | 25.71 |
| H35 | $Nb_2O_5$ | 31.28 |
| L35 | $SiO_2$ | 33.68 |
| H36 | $Nb_2O_5$ | 15.16 |
| L36 | $SiO_2$ | 45.93 |
| H37 | $Nb_2O_5$ | 30.31 |
| L37 | $SiO_2$ | 18.10 |
| H38 | $Nb_2O_5$ | 23.69 |
| L38 | $SiO_2$ | 41.09 |
| H39 | $Nb_2O_5$ | 16.80 |
| L39 | $SiO_2$ | 41.33 |
| H40 | $Nb_2O_5$ | 16.34 |
| L40 | $SiO_2$ | 26.99 |
| H41 | $Nb_2O_5$ | 32.77 |
| L41 | $SiO_2$ | 25.90 |
| H42 | $Nb_2O_5$ | 20.98 |
| L42 | $SiO_2$ | 42.91 |
| H43 | $Nb_2O_5$ | 18.30 |
| L43 | $SiO_2$ | 41.13 |
| H44 | $Nb_2O_5$ | 24.01 |
| L44 | $SiO_2$ | 21.16 |
| H45 | $Nb_2O_5$ | 22.86 |
| L45 | $SiO_2$ | 21.12 |
| H46 | $Nb_2O_5$ | 25.34 |
| L46 | $SiO_2$ | 28.41 |
| H47 | $Nb_2O_5$ | 9.11 |
| L47 | $SiO_2$ | 41.14 |
| H48 | $Nb_2O_5$ | 20.56 |
| L48 | $SiO_2$ | 20.37 |
| H49 | $Nb_2O_5$ | 12.77 |
| L49 | $SiO_2$ | 43.49 |
| H50 | $Nb_2O_5$ | 34.68 |
| L50 | $SiO_2$ | 23.86 |
| H51 | $Nb_2O_5$ | 31.46 |

The conditions for forming the optical thin film 3 are shown below.
  Conditions for Forming the Optical Thin Film
  Refractive Index of High-Refraction Layers:
  $n_H$=2.4065 (wavelength, 405.0 nm)
  2.259 (wavelength, 546.1 nm)
  2.224 (wavelength, 632.8 nm)
  Refractive Index of Low-Refraction Layers:
  $n_L$=1.479 (wavelength, 405.0 nm)
  1.468 (wavelength, 546.1 nm)
  1.4654 (wavelength, 632.8 nm)
  Number of High-Refraction Layers: 51 layers
  Number of Low-Refraction Layers: 50 layers
  Refractive Index of Vacuum (Air): $n_0$=1
  Refractive Index of Screen Substrate: $n_g$=1.71

After forming the optical thin film 63, a light diffusion layer 64 of arrayed beads with a diameter of 200 μm was formed on the optical thin film 63.

The Reflectance of the thus manufactured projection screen 61 was measured for wavelengths ranging from 380 nm to 780 nm. The incident angle of light with respect to the screen was zero degrees in this case. The results are shown in FIG. 9.

Figure 9:
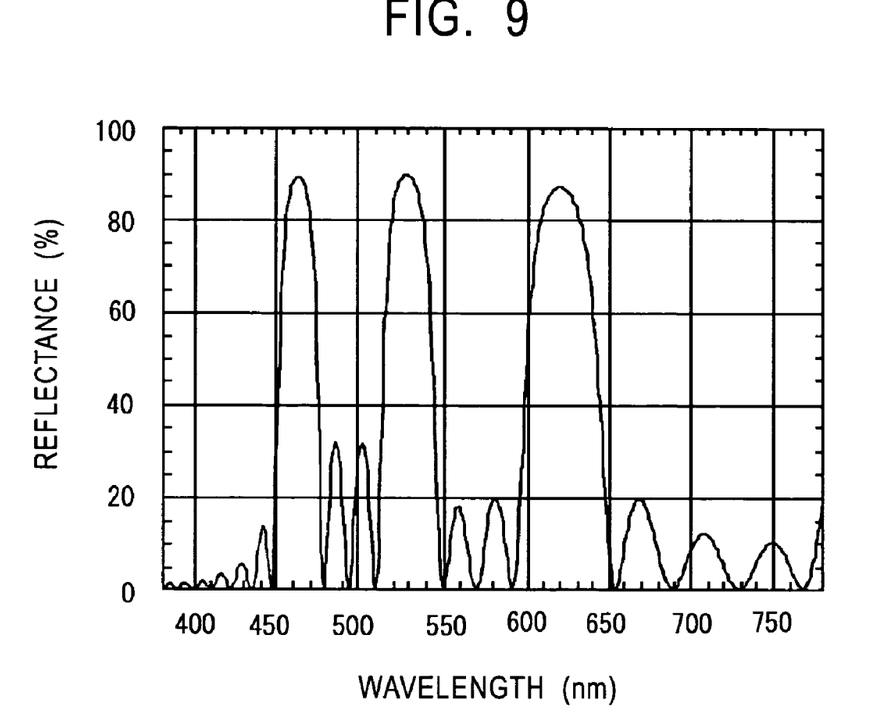
FIG. 9 is a characteristic view showing a relationship between the wavelength and reflectance of the projection screen according to the example.

As understood from FIG. 9, the projection screen 61 exhibited a reflectance as high as about 90% for the three-primary-color light with the blue wavelength of about 460 nm, the green wavelength of about 520 nm, and the red wavelength of about 620 nm. The highest reflectance in other wavelength ranges was only about 30%. This showed that the projection screen 61 selectively reflected the three-primary-color light with the blue wavelength of about 460 nm, the green wavelength of about 520 nm, and the red wavelength of about 620 nm, and transmitted the light in the wavelength ranges other than the wavelength ranges of the three-primary-color light. The projection screen 61 was provided with the optical thin film 63 and the thickness of each layer of the optical thin film 63 was determined by simulation based on the matrix method, thus having high reflectance for the light in the particular wavelength ranges and high transmittance for the visible light other than the light in the particular wavelength ranges.

INDUSTRIAL APPLICABILITY

A projection screen according to the present invention displays an image by projecting light from a light source and includes an optical thin film composed of dielectric multilayers which exhibits high reflectance for light in particular wavelength ranges and high transmittance for at least visible light other than the light in the particular wavelength ranges. The thickness of each of the dielectric multilayers composing the optical thin film is determined by simulation based on a matrix method.

Furthermore, with the method for manufacturing a projection screen of the present invention, a projection screen includes an optical thin film composed of dielectric multilayers and displays an image by projecting light from a light source. The thickness of each of the dielectric multilayers is determined by simulation based on a matrix method so that the dielectric multilayers exhibit high reflectance for light in particular wavelength ranges and high transmittance for at least visible light other than the light in the particular wavelength ranges.

The thus constructed projection screen of the present invention provided with the above-described optical thin film has high reflectance for the light in the particular wavelength ranges and high transmittance for at least the visible light excluding the light in the particular wavelength ranges.

Accordingly, this projection screen can greatly suppress reflection of extraneous light as compared to ordinary screens, resulting in higher contrast of images formed on the projection screen and reduction in projection of extraneous light, thereby achieving bright images. Hence, the projection screen of the present invention can provide clear images regardless of the environment where the screen is used, even in a bright environment.

The invention claimed is:

1. A projection screen for displaying an image by projecting light from a light source,
   the screen is comprised of an optical film including a multilayer dielectric having alternatively laminated high-refraction and low-refraction layers, the thickness of each of the layers being from 5 nm to 100 nm and total number of dielectric multilayers being odd number, the average thickness for the layers of the screen being less than 50 nm, and the screen having high reflectance for light in at least one particular wavelength range and substantially lower reflectance for light outside any of one or more high reflectance wavelength range for the screen.

2. A projection screen according to claim 1, wherein the high-refraction layers comprise any one of $Nb_2O_5$, $TiO_2$ and $Ta_2O_5$.

3. A projection screen to claim 1, wherein the low-refraction layers comprise any one of $SiO_2$ and $MgF_2$.

4. A projection screen according to claim 1, wherein a light diffusion layer is disposed on an outermost layer of the optical thin film or in the optical thin film as an interlayer.

5. A projection screen according to claim 4, wherein the light diffusion layer comprises a plurality of sublayers.

6. A projection screen according to claim 4, wherein the light diffusion layer comprises arrayed beads or a film having a microlens array.

7. A projection screen according to claim 1, wherein the optical thin film comprises a light absorption layer for absorbing transmitted light.

8. A projection screen according to claim 7, wherein the light absorption layer contains black paint.

9. A projection screen according to claim 8, wherein the light absorption layer is a support containing black paint.

10. A projection screen according to claim 1, wherein a support on which the optical thin film is formed is flexible.

11. A projection screen according to claim 10, wherein the support comprises a polymeric material.

12. A projection screen according to claim 11, wherein the polymeric material comprises any one of polyethylene terephthalate, polyethylene naphthalate, polyether sulfone, and polyolefin.

13. A projection screen according to claim 1, wherein the light is laser light.

14. A projection screen according to claim 1, wherein said at least one particular wavelength comprises a red wavelength, a green wavelength, and a blue wavelength.

15. A method of manufacturing a projection screen which is comprised of an optical film including a multilayer dielectric having alternatively laminated high-refraction layers and low-refraction layers,
   the method comprising forming each of the high-refraction layers and low-refraction layers so that they have a thickness of from 5 rm to 100 nm and the average thickness for the layers being less than 50 nm, such that the optical thin film has high reflectance for light in at least one particular wavelength range and substantially lower reflectance for light outside any of one or more high reflectance wavelength range for the screen.

16. A method for manufacturing a projection screen according to claim 15, further comprising the steps of forming the optical thin film on a support which supports the optical thin film, and forming a light diffusion layer on an outermost layer of the optical thin film or in the optical thin film as an interlayer.

17. A method for manufacturing a projection screen according to claim 16, wherein the support contains black paint.

18. A method for manufacturing a projection screen according to claim 16, wherein the support is a transparent support and a light absorption layer is formed on a surface of the transparent support.

19. A method for manufacturing a projection screen according to claim 15, wherein the optical thin film is formed by alternately laminating high-refraction layers and low-refraction layers.

20. A projection screen for displaying an image by projecting light from a light source, wherein
   the screen is comprised of an optical film including a multilayer dielectric having alternatively laminated high-refraction and low-refraction layers, the thickness of each layer of the dielectric multilayer being from 5 nm to 100 nm and total number of dielectric layers being from 50 to 100 and the average thickness for the layers being less than 50 nm, and having high reflectance for light in at least one particular wavelength range and substantially lower reflectance for light outside any of one or more high reflectance wavelength range for the screen.

* * * * *